(12) United States Patent
Irish et al.

(10) Patent No.: US 7,721,023 B2
(45) Date of Patent: May 18, 2010

(54) I/O ADDRESS TRANSLATION METHOD FOR SPECIFYING A RELAXED ORDERING FOR I/O ACCESSES

(75) Inventors: John D. Irish, Rochester, MN (US); Charles R. Johns, Austin, TX (US); Andrew H. Wottreng, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 759 days.

(21) Appl. No.: 11/274,842

(22) Filed: Nov. 15, 2005

(65) Prior Publication Data

US 2007/0130372 A1 Jun. 7, 2007

(51) Int. Cl.
*G06F 7/02* (2006.01)
(52) U.S. Cl. .......................................... 710/40; 710/36
(58) Field of Classification Search .................... 710/1, 710/5, 22, 202, 207, 209, 309, 3; 711/200, 711/206, 173, 209, 207, 202, 203, 133, 105, 711/158; 345/501, 520; 370/394
See application file for complete search history.

(56) References Cited

U.S. PATENT DOCUMENTS

| | | | |
|---|---|---|---|
| 4,680,700 A | 7/1987 | Hester et al. | |
| 5,745,913 A * | 4/1998 | Pattin et al. | 711/105 |
| 5,751,990 A | 5/1998 | Krolak et al. | |
| 5,905,509 A * | 5/1999 | Jones et al. | 345/520 |
| 5,937,437 A | 8/1999 | Roth et al. | |
| 5,949,436 A * | 9/1999 | Horan et al. | 345/501 |
| 5,978,858 A * | 11/1999 | Bonola et al. | 710/1 |
| 6,128,669 A * | 10/2000 | Moriarty et al. | 710/1 |
| 6,260,131 B1 * | 7/2001 | Kikuta et al. | 711/210 |
| 6,397,316 B2 * | 5/2002 | Fesas, Jr. | 711/200 |
| 6,615,295 B2 * | 9/2003 | Shah | 710/54 |
| 6,886,090 B1 * | 4/2005 | Campbell | 711/206 |
| 7,099,986 B2 * | 8/2006 | Pettey et al. | 710/314 |
| 7,529,245 B1 * | 5/2009 | Muller et al. | 370/394 |
| 2003/0145136 A1 * | 7/2003 | Tierney et al. | 710/3 |
| 2004/0073743 A1 | 4/2004 | Arimilli et al. | |
| 2004/0078631 A1 | 4/2004 | Rogers et al. | |
| 2005/0005080 A1 | 1/2005 | Dunshea et al. | |

(Continued)

OTHER PUBLICATIONS

PCI Express, PCI Express Base Specification Rev. 1.1, 2005, pp. 1-126 and 503-505.*

(Continued)

*Primary Examiner*—Henry W. H. Tsai
*Assistant Examiner*—Cheng-Yuan Tseng
(74) *Attorney, Agent, or Firm*—Francis Lammes; Stephen J. Walder, Jr.; Matthew B. Talpis

(57) ABSTRACT

An I/O address translation method for specifying relaxed ordering for I/O accesses are provided. With the apparatus and method, storage ordering (SO) bits are provided in an I/O address translation data structure, such as a page table or segment table. These SO bits define the order in which reads and/or writes initiated by an I/O device may be performed. These SO bits are combined with an ordering bit, e.g., the Relaxed Ordering Attribute bit of PCI Express, on the I/O interface. The weaker ordering indicated either in the I/O address translation data structure or in the I/O interface relaxed ordering bit is used to control the order in which I/O operations may be performed.

16 Claims, 5 Drawing Sheets

U.S. PATENT DOCUMENTS

2005/0138260 A1*  6/2005  Love .......................... 710/306
2005/0289306 A1* 12/2005  Muthrasanallur et al. ... 711/158
2006/0129765 A1*  6/2006  Rose et al. .................. 711/133

OTHER PUBLICATIONS

U.S. Appl. No. 11/011,784, Takeshi Yamazaki.

"Virtual Memory Addressing", Ixora Pty Ltd, Mar. 28, 2002, http://www.ixora.com.au/notes/virtual_memory.htm, 1 page.

Ajay V. Bhatt, "Creating a PCI Express Interconnect", Intel Corporation, White Paper, 2002, pp. 1-8.

* cited by examiner

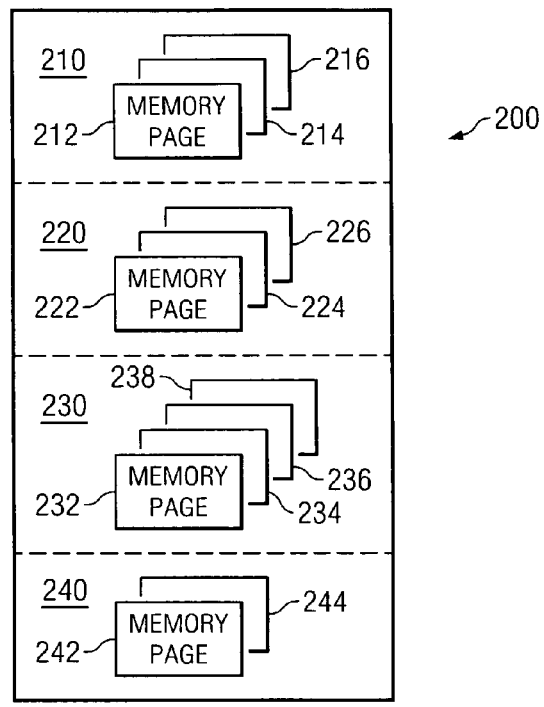

FIG. 2

| 510 | 520 | 530 |
|---|---|---|
| IOIF S BIT FOR THE CURRENT I/O OPERATION | SO BITS FOR THE CURRENT I/O OPERATION | RESULTING ORDERING OF I/O OPERATIONS |
| 0 | xx | PREVIOUS READS AND WRITES MAY BE PERFORMED BEFORE OR AFTER THIS I/O OPERATION (WEAK ORDERING) |
| x | 00 | PREVIOUS READS AND WRITES MAY BE PERFORMED BEFORE OR AFTER THIS I/O OPERATION (WEAK ORDERING) |
| 1 | 10 | PREVIOUS WRITES MUST BE PERFORMED BEFORE THIS I/O OPERATION. PREVIOUS READS MAY BE PERFORMED BEFORE OR AFTER THIS I/O OPERATION (RELAXED ORDERING) |
| 1 | 11 | PREVIOUS READS AND WRITES MUST BE PERFORMED BEFORE THIS I/O OPERATION (STRONG ORDERING) |

FIG. 5

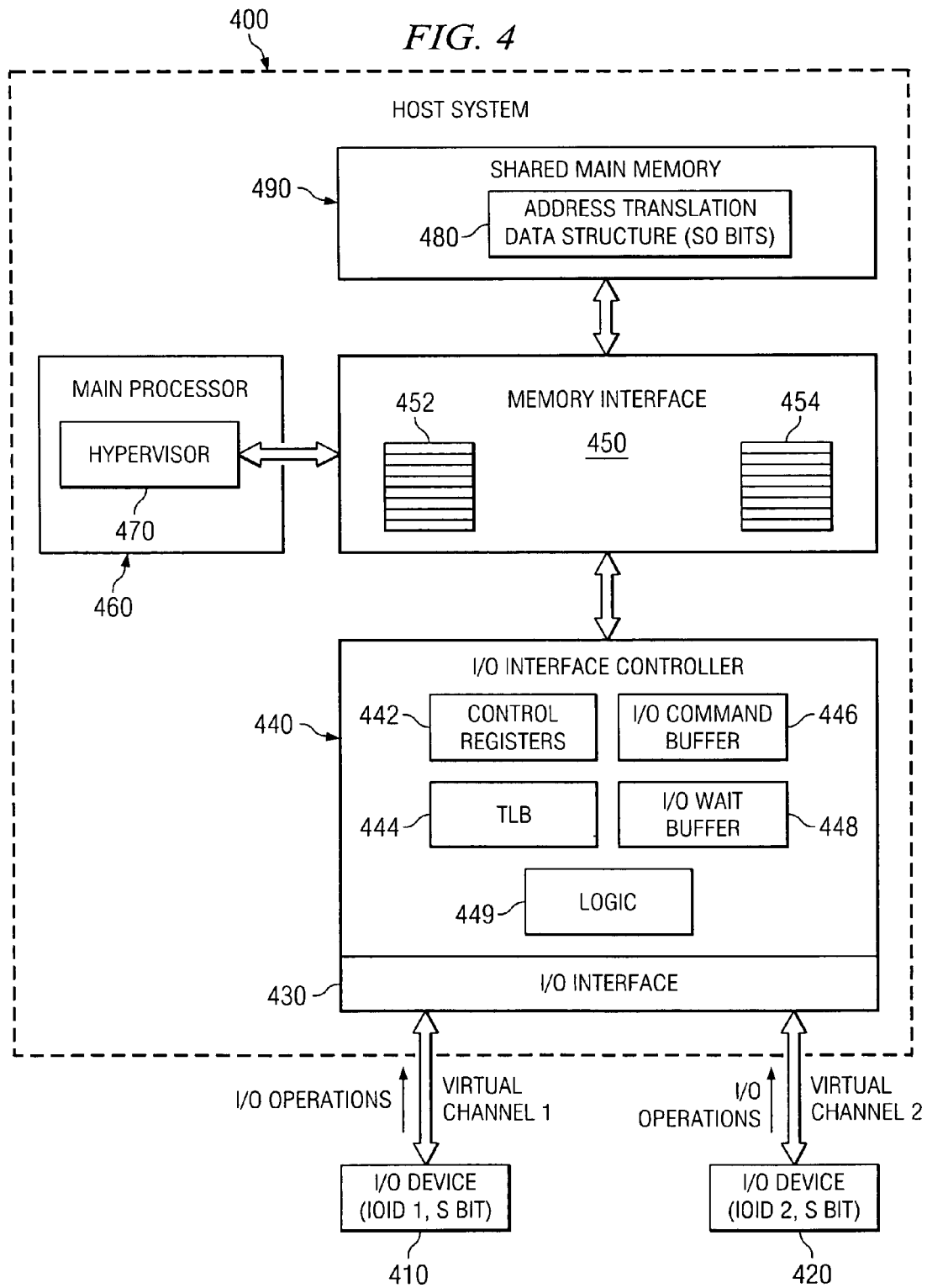

I/O ADDRESS TRANSLATION METHOD FOR SPECIFYING A RELAXED ORDERING FOR I/O ACCESSES

BACKGROUND OF THE INVENTION

1. Technical Field

The present invention relates generally to an improved data processing system. More specifically, the present invention is directed to an improved apparatus and method for I/O address translation in order to specify a relaxed ordering for I/O accesses.

2. Description of Related Art

Operating systems are responsible for managing the virtual memory of a computer system. Virtual memory is addressable memory that extends beyond the limits of the available physical memory and is thus, "virtual." The principal benefit of using virtual memory is that a user can run more applications at once and work with larger amounts of data than would be possible if the logical address space were limited to the available physical memory. Instead of equipping a computer with amounts of physical memory large enough to handle all possible needs, the user can install only enough physical memory to meet average needs. During those occasional times when more memory is needed for large tasks or many applications, the user can take advantage of virtual memory.

The operating system uses a Virtual Memory Manager (VMM) to perform virtual memory management. Virtual memory management involves the establishment of virtual address translations to real physical memory locations and the generation of data structures, referred to as "page frame tables" or simply "page tables," which may be used to perform virtual to real address translations. The VMM also provides a number of routines that software can use to modify or obtain information about the software operations. For example, the VMM may be used to hold portions of the logical address space in physical memory, lock portions of the logical address space in their physical memory locations, determine whether a particular portion of the logical address space is currently in physical memory, and determine, from a logical address, the physical address of a block of memory.

The VMM extends the logical address space by using part of an available secondary storage, e.g., a hard disk, to hold portions of applications and data that are not currently in use in physical memory. When an application needs to operate on portions of memory that have been transferred to disk, the VMM loads those portions back into physical memory by making them trade places with other, unused segments of memory. This process of moving portions, or pages, of memory between physical RAM and the hard disk is called "paging."

When a software component tries to access data in a page of memory that does not currently have a valid virtual to physical translation resident in the translation hardware, the CPU issues a special kind of bus error known as a "page fault." Translation hardware is platform specific, but usually includes translation lookaside buffers (TLBs), which are caches used to hold the most recently used page table entries, and a hardware page frame table. A similar translation mechanism is also used for I/O access of memory.

The VMM intercepts page faults and tries to load the necessary translation into the hardware page frame table. In some cases not only does the referenced page not have a valid translation in the hardware page frame table, but is also not resident in physical memory. In this case, not only does the VMM have to load a valid translation into the hardware page table, but it must also load the affected page or pages into physical memory. The VMM does so by executing its own internal page-fault handler. This loading of the valid translation and affected pages takes additional processor cycles to perform and thus, is a source of latency in the operation of the processor of the computer system.

The handling of page faults is not the only source of latency in virtual memory computer systems. Congestion also results in latency in the computer system that causes the processor to execute instructions at a slower rate. That is, when there are read/write instructions accessing the same portions of memory as other read/write instructions, congestion occurs in that many accesses, from multiple processors or input/output (I/O) devices for example, to the same portion of memory are pending and must be executed in an ordered manner. Thus, because of congestion, a specific access may take more time to complete than accesses of a portion of memory that is less congested. If subsequent accesses to portions of memory with less congestion are unnecessarily delayed, such as because of the need to perform an access to a congested portion of memory first, overall performance of the computer system suffers. This is because various buffers and resources in the I/O subsystem are tied up longer than necessary and are, therefore, unavailable for use by subsequent I/O reads and writes.

In order to avoid such problems due to congestion, many processors include the capability to perform I/O reads and writes out-of-order whenever possible, i.e. the reads and writes are performed in the main memory in a different order from which an I/O device initiates the accesses. This is referred to as weak ordering of the reads and writes.

However, in some ordering schemes, the order in which reads and/or writes occur is essential to an underlying communication scheme. For example, in a producer-consumer protocol, one block of writes may convey data that was requested as part of an I/O operation request, such as a disk read. A subsequent write may indicate that the I/O operation has completed. For this protocol, it is essential that this last write be performed after all previous writes. This ordering is referred to as strong or strict ordering.

While weak ordering provides flexibility with the execution of reads and writes, there are times when such weak ordering may result in errors in the processing of reads and writes, i.e. when the order in which reads and/or writes are performed is important to proper operation of the system. While strong or strict ordering ensures proper operation of the system, such strong or strict ordering for all I/O operations may result in congestion, thereby reducing the speed at which I/O reads and writes may be performed.

SUMMARY OF THE INVENTION

In view of the above, it would be beneficial to have an apparatus and method for controlling the ordering of I/O operations so as to maximize the performance of the overall system. More specifically, it would be beneficial to have an apparatus and method that controls ordering such that the flexibility of weak ordering is permitted as much as possible with strong or strict ordering being followed when it is needed.

Some previous communication protocols, such as Peripheral Component Interconnect (PCI) Express have provided mechanisms for identifying when weak ordering is possible with input/output (I/O) writes. For example, PCI Express provides a Relaxed Ordering Attribute bit that specifies whether a write I/O operation can be performed before a preceding write I/O operation. However, even with this mechanism, what is needed is a mechanism to control the Relaxed Ordering Attribute bit in such a way as to provide weak ordering when possible for good performance, and provide strong or strict ordering when such rigidity in ordering of I/O operations is needed.

The present invention provides such an I/O operation order control mechanism in which weak and strong ordering are followed as needed so as to maximize the performance of the system. With the mechanism of the present invention, storage ordering (SO) bits are provided in an I/O address translation table, such as an I/O page table or I/O segment table. These SO bits define the order in which reads and/or writes initiated by an I/O device may be performed. These SO bits are combined with an ordering bit, e.g., the Relaxed Ordering Attribute bit of PCI Express, on the I/O interface. That is, PCI Express transmits read and write commands, addresses, and other information in a logical group called a Transport Layer packet. This packet is transmitted serially across a set of physical wires. The Relaxed Ordering Attribute bit is part of the Transport Layer packet transmitted on the physical wires of an I/O bus, e.g. the PCI Express physical wires. The ordering bit of the present invention may be the Relaxed Ordering Attribute bit of PCI Express, or another ordering bit of a different type if a bus other than a PCI Express bus is utilized, for example. The weaker ordering indicated either in the I/O address translation data structure or in the I/O interface ordering bit is used to control the order in which I/O operations may be performed.

The ability to specify weak ordering via bits in the I/O address translation data structure allows for simpler I/O device design, i.e. special logic within the I/O device itself need not be required in order to handle weak ordering of I/O operations. With the present invention, software may set up the I/O address translation data structure so that the pages associated with I/O data have weak ordering and the pages containing I/O completion data have strong ordering. There is no need for the I/O device to be cognizant of the I/O write that indicates completion. The I/O device can simply be given a sequence of I/O operations, e.g., direct memory access (DMA) operations, where the last operation is a write that indicates the I/O operation is complete. The I/O device can simply treat this as a sequence of I/O operations to initiate in the specified order. Thus, a simple I/O device and/or I/O bridge can be used and ordering can still be controlled by software as needed via SO bits in an I/O address translation data structure.

In one exemplary embodiment of the present invention, a method, computer program product, and apparatus are provided in which an I/O operation request is received via an I/O interface identifying a current I/O operation to be executed. A first ordering identifier associated with a page of memory targeted by the I/O operation request is retrieved from an address translation data structure. An ordering of execution of the current I/O operation is determined based on the first ordering identifier and the current I/O operation is executed based on the determined ordering of execution of the current I/O operation.

The I/O operation request may include a second ordering identifier. In such a case, when determining an ordering of execution of the current I/O operation, the ordering of execution is determined based on both the first ordering identifier and the second ordering identifier. Determining an ordering of execution of the I/O operation based on the first ordering identifier and the second ordering identifier may include selecting a weakest ordering identifier of the first ordering identifier and the second ordering identifier.

If either the first ordering identifier or the second ordering identifier identifies a weak ordering of I/O operations, then the determination of an ordering of execution of the current I/O operation may include identifying the ordering as a weak ordering in which any previous I/O operations may be executed before or after the current I/O operation. If the second ordering identifier identifies a strong ordering of I/O operations and the first ordering identifier identifies a relaxed ordering of I/O operations, then the determination of an ordering of execution of the current I/O operation may include identifying the ordering as a relaxed ordering in which any previous write I/O operations must be executed prior to execution of the current I/O operation and any previous read I/O operations may be executed before or after the current I/O operation. If both the first ordering identifier and the second ordering identifier identify a strong ordering of I/O operations, then the determination of an ordering of execution of the current I/O operation may include identifying the ordering as a strong ordering in which any previous I/O operations must be executed before the current I/O operation.

In an exemplary embodiment, the I/O interface may be, for example, a Peripheral Component Interconnect (PCI) Express bus bridge and the second ordering identifier may be a PCI Express Relaxed Ordering Attribute bit. In addition, in an exemplary embodiment of the present invention, the method may be implemented in an I/O interface controller. Furthermore, the address translation data structure may be a page table and the mechanisms of the present invention may further include performing a virtual to physical address translation on a virtual address in the I/O operation request using the address translation data structure. In such a case, retrieving the first ordering identifier associated with a page of memory targeted by the I/O operation request may be performed as part of the virtual to physical address translation.

In one exemplary embodiment of the present invention, the apparatus may comprise a memory, an I/O interface, and an I/O interface controller coupled to the I/O interface and the memory. With such an apparatus, the I/O controller may receive an I/O operation request via the I/O interface identifying a current I/O operation to be executed, wherein the I/O operation request includes a first ordering identifier. The I/O controller may further retrieve a first ordering identifier associated with the I/O interface, retrieve a second ordering identifier associated with a page of the memory targeted by the I/O operation request from an address translation data structure, and determine an ordering of execution of the current I/O operation based on the first ordering identifier and the second ordering identifier. The current I/O operation may be executed based on the determined ordering of execution of the current I/O operation.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is an exemplary diagram illustrating a shared main memory and its segments in accordance with one exemplary embodiment of the present invention;

FIG. 4 is an exemplary block diagram illustrating the interaction between primary operational components of one exemplary embodiment of the present invention;

FIG. 5 is an exemplary diagram illustrating various combinations of SO bit and I/O Interface bus (IOIF) S bit settings in accordance with one exemplary embodiment of the present invention.

DETAILED DESCRIPTION OF THE PREFERRED EMBODIMENTS

Figure 1:
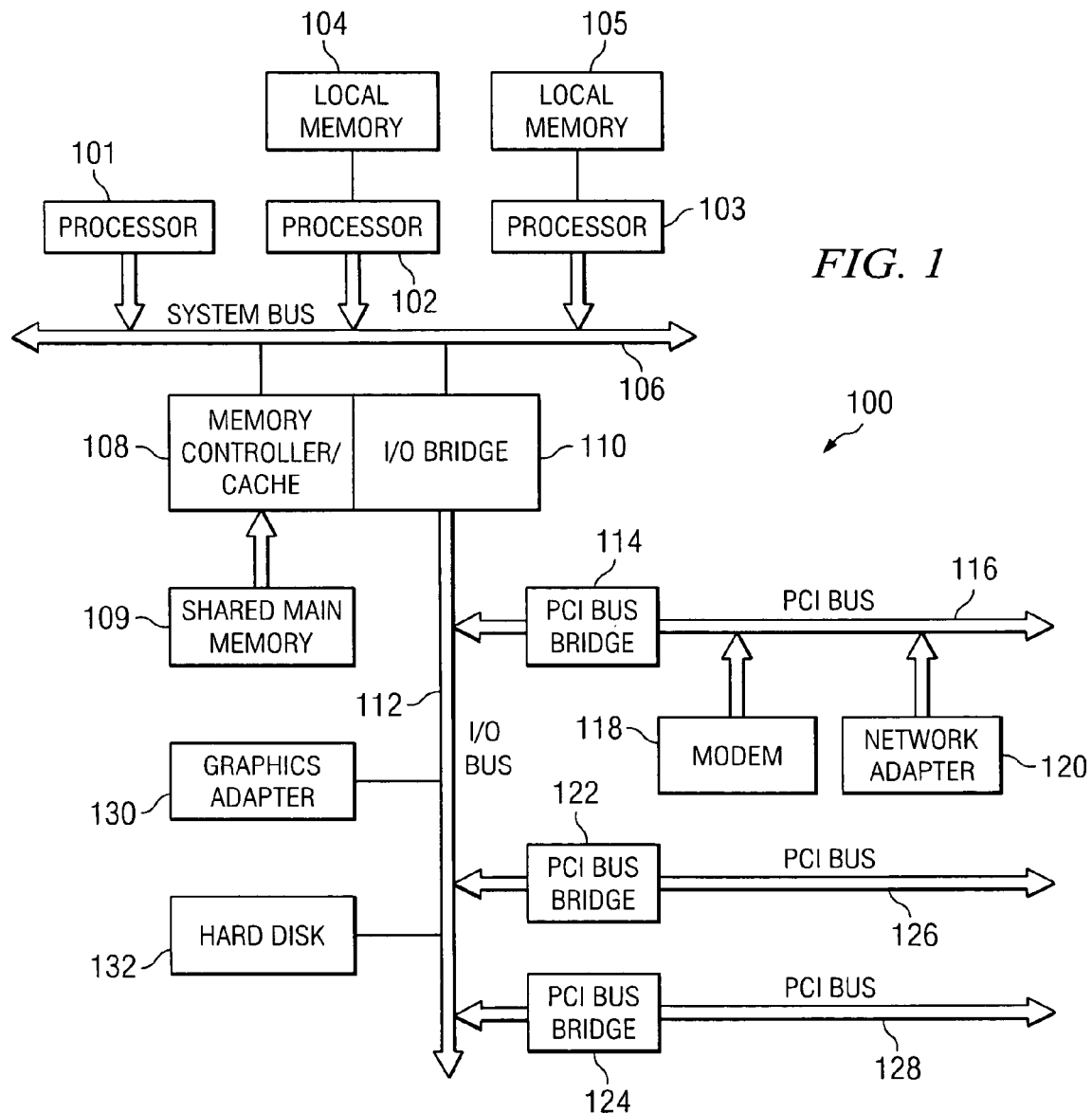
FIG. 1 is an exemplary block diagram of a data processing system in which exemplary aspects of the present invention may be implemented.

Referring to FIG. 1, an exemplary block diagram of a data processing system in which exemplary aspects of the present invention may be implemented is depicted. Data processing system 100 may be a multiprocessor system including a plurality of processors 101-103 connected to system bus 106. In the depicted example, processor 101 is a main processor and processors 102-103 are sub-processors. Alternatively, a single processor system may be employed.

Also connected to system bus 106 is memory controller/cache 108, which provides an interface to shared main memory 109. Each of the processors 101-103 share the main memory 109. However, each of the sub-processors has its own local memory 104, 105 with which it executes instructions. Input/Output (I/O) Bus Bridge 110 is connected to system bus 106 and provides an interface to I/O bus 112. Although memory controller/cache 108 and I/O Bus Bridge 110 are separate elements of the data processing system in the depicted example, they may be integrated without departing from the spirit and scope of the present invention.

Peripheral component interconnect (PCI) bus bridge 114 connected to I/O bus 112 provides an interface to PCI local bus 116. A number of modems may be connected to PCI local bus 116. Typical PCI bus implementations will support four PCI expansion slots or add-in connectors. Communications links to other data processing systems may be provided through modem 118 and/or network adapter 120 connected to PCI local bus 116 through add-in connectors.

Additional PCI bus bridges 122 and 124 provide interfaces for additional PCI local buses 126 and 128, from which additional modems or network adapters may be supported. In this manner, data processing system 100 allows connections to multiple network computers. A memory-mapped graphics adapter 130 and hard disk 132 may also be connected to I/O bus 112 as depicted, either directly or indirectly.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

It may be desirable to transfer data from an I/O device, such as an external storage system coupled via a PCI bus 128, for example, hard disk 132, or the like, to the shared main memory 109 of the data processing system 100. Such a transfer operation requires address translation from the I/O address space of the I/O device, i.e. the memory space visible to the I/O device (sometimes referred to as the virtual memory space), to the physical memory space of the shared main memory 109.

In accordance with the present invention, the shared main memory 109 is divisible into a number of segments, each segment being divisible into a plurality of pages. The division of the shared main memory 109 is depicted in FIG. 2, for example. As shown in FIG. 2, the shared main memory 200 includes a plurality of segments 210-240 with each segment having a plurality of pages 212-216, 222-226, 232-238, and 242-244. The page size in each segment 210-240 may be specified, but it must be uniform within the segment.

A hypervisor program running on the main processor 101 initializes an I/O segment table and an I/O page table. The hypervisor program is software used to manage a plurality of virtual machines, i.e. operating systems and execution environments. As such, the hypervisor controls accesses to the shared main memory and provides support for virtual to physical address translation. As part of this virtual to physical address translation, the I/O segment table and I/O page table are provided.

Figure 3:
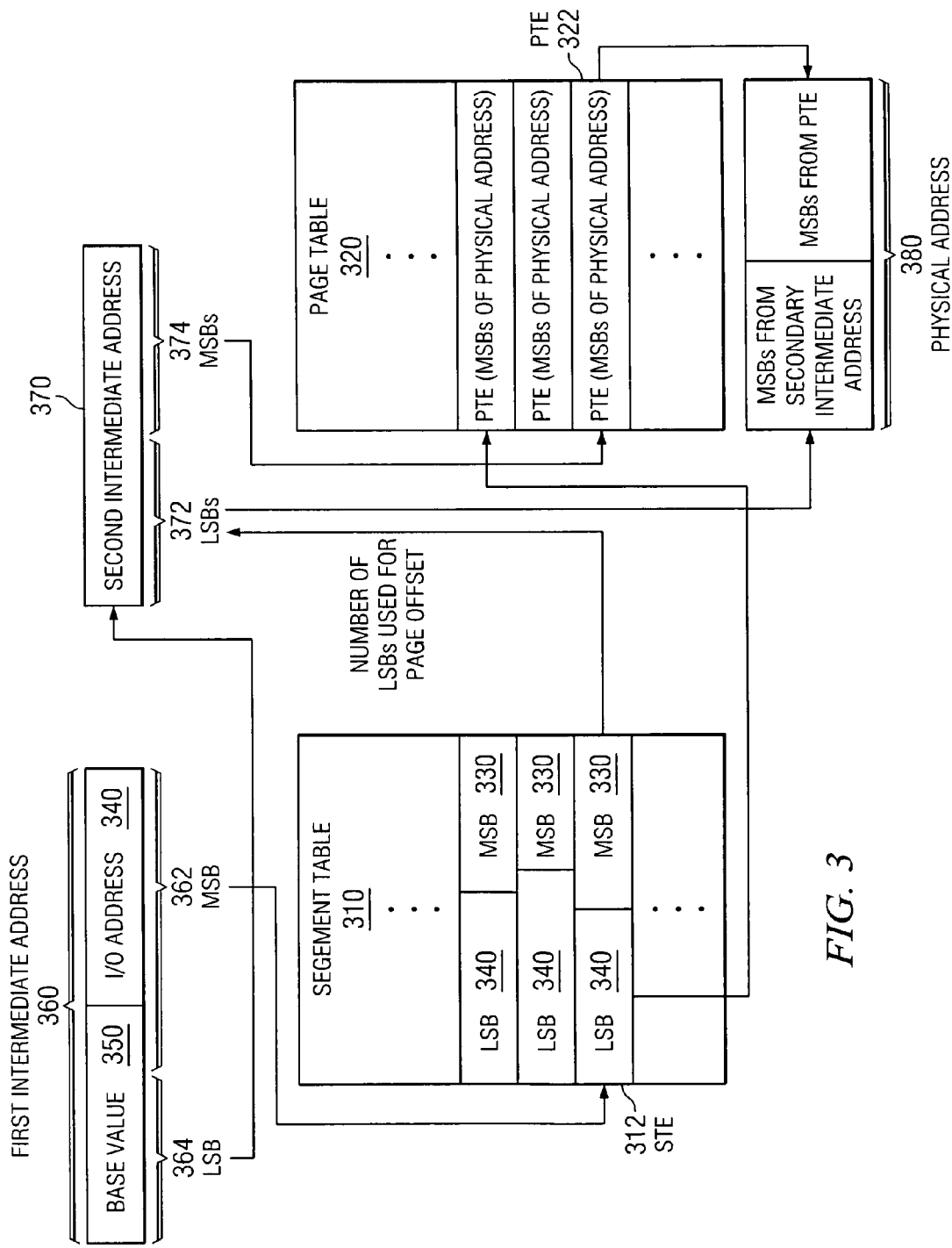
FIG. 3 is an exemplary diagram illustrating an exemplary virtual address to physical address translation mechanism in accordance with one exemplary embodiment of the present invention.

FIG. 3 is an exemplary diagram illustrating the I/O segment table 310 and I/O page table 320 that may be used with one exemplary embodiment of the present invention. The most significant bits (MSBs) 330 of each entry 312 in the segment table 310 define the page size. The least significant bits (LSBs) 340 of each entry 312 in the segment table 310 define a base position in the I/O page table 320. Each base position in the I/O page table 320 is the starting entry in a plurality of entries corresponding to pages in the shared main memory 109. Each entry 322 within the I/O page table 320 represents the MSBs of the physical addresses in the shared main memory 109.

A contiguous region of I/O address space, i.e. a direct memory access (DMA) region, may be mapped to a segment of the shared main memory 109 by registering the DMA region via a system call to the main processor 101. For each I/O address, a base value will be added to the I/O address to obtain a first intermediate address. The MSBs of the first intermediate address are used as a pointer to an entry in the segment table 310. The remaining bits of the first intermediate address are used as a second intermediate address. The MSBs of the entry 312 in the segment table 310 (i.e., the page size) define a number of LSBs of the second intermediate address to be used for a page offset in the physical address. The remaining bits of the entry 312 of the segment table 310 are used as a pointer to a starting entry in the I/O page table 320. The remaining bits of the second intermediate address (i.e., the MSBs thereof) are used as a pointer to an entry 322 in the I/O page table 320 via offset from the starting entry in the I/O page table 320. The contents of the entry 322 of the I/O page table 320 are used as the MSBs of the physical address, while the LSBs of the second intermediate address augment the entry 322 via use as the LSBs of the physical address.

It should be appreciated that the address translation mechanism depicted in FIG. 3 is but one example of a virtual to physical address translation using an I/O segment table and I/O page table for performing the address translation. Other types of virtual to physical address translations that make use of address translation data structures may be used without departing from the spirit and scope of the present invention.

As mentioned above, prior art mechanisms have provided either weak or strong ordering of I/O operations. Weak ordering provides flexibility and thus, reduces congestion for accessing memory locations, but may cause errors or data corruption when strict or strong ordering is necessary. On the other hand, strong ordering ensures proper operation of the system when accessing memory locations, but suffers from congestion and thus, reduces the performance of the system with regard to memory accesses.

In view of these drawbacks of the prior art, the present invention provides an apparatus and method for controlling the ordering of I/O operations so as to maximize the performance of the overall system. More specifically, the present invention provides an apparatus and method that controls ordering such that the flexibility of weak ordering is permitted as much as possible with strong or strict ordering being followed when it is needed.

In one exemplary embodiment of the present invention, the Peripheral Component Interconnect (PCI) Express architecture is utilized for providing an interconnect between I/O devices and the rest of the system, e.g., processors, memory, etc. The PCI Express architecture provides a Relaxed Ordering Attribute bit that specifies whether a write I/O operation can be performed before a preceding write I/O operation. The I/O devices themselves, through their respective device drivers, set this relaxed ordering attribute bit in the control registers of the I/O interface to specify if relaxed ordering of I/O operations is permitted between the I/O device and the rest of the system. In one exemplary embodiment of the present invention, a mechanism is provided to control the Relaxed Ordering Attribute bit in such a way as to provide weak ordering when possible for good performance, and provide strong or strict ordering when such rigidity in ordering of I/O operations is needed.

With the mechanism of the present invention, storage ordering (SO) bits are provided in an I/O address translation data structure, such as an I/O page table data structure and/or segment table data structure as illustrated in FIG. 3, for example. These SO bits define the order in which reads and/or writes initiated by an I/O device may be performed. These SO bits are combined with a relaxed ordering bit, e.g., the Relaxed Ordering Attribute bit of the PCI Express architecture, on the I/O interface in order to identify when weak, relaxed or strong ordering of I/O operations is to be followed. In the context of the present invention, weak ordering is when both read and write I/O operations may be performed out of order with respect to the order in which the I/O device sends them, i.e. previous reads or writes may be performed before or after a current I/O operation. Relaxed ordering is when only read I/O operations may be performed out of order but write I/O operations must be performed in the same order as they are sent by the I/O device, i.e. previous write I/O operations must be performed before a current I/O operation but previous read I/O operations may be performed before or after the current I/O operation. Strict or strong ordering is when both read and write I/O operations must be perform in the same order as they are sent by the I/O device.

With the present invention a combination of the relaxed ordering bit of the I/O interface and the SO bit of the address translation data structure are utilized to determine what type of ordering is permitted with respect to current and previous I/O operations. In particular, the weaker ordering indicated either by the SO bit or the relaxed ordering bit is used to control the order in which I/O operations may be performed.

FIG. 4 is an exemplary block diagram illustrating the interaction between primary operational components of one exemplary embodiment of the present invention. As shown in FIG. 4, I/O devices 410 and 420 send I/O operation requests to the host system 400 via virtual channels established by the I/O interface (IOIF) 430. A virtual channel is a logical subdivision of the IOIF 430 that permits the bandwidth of the IOIF 430 to be allocated and managed for a plurality of I/O devices.

Each I/O device 410 and 420, or collection of I/O devices, has an associated I/O identifier (IOID). The IOID is used, along with the virtual channels, by the IOIF controller 440 to aid in handling the processing of I/O operation requests and returning results of processing of I/O operation requests. The IOIF controller 440 may maintain data structures that include the IOID, virtual channel identifiers, and other information that may be used in routing data to and from the I/O devices 410 and 420. These data structures may be maintained, for example, in control registers 442.

In addition to the IOID and virtual channel identifiers, the IOIF controller 440 further makes use of a relaxed ordering bit, i.e. IOIF S bit, for each IOID and virtual channel. The relaxed ordering bit identifies whether I/O operation requests received from the corresponding I/O device 410, 420 may be performed out-of-order or whether strict ordering (the default ordering) is to be utilized. The relaxed ordering bit may be set by the I/O devices 410, 420 via their respective device drivers (not shown), microcode running in the processors (also not shown) in the I/O devices 410, 420, or the like.

The IOIF S bit is transmitted, by the I/O devices 410 and 420 on their respective virtual channels of the IOIF 430 along with the address, command type (read, write, etc.) and other information for an I/O operation request. The I/O devices 410 and 420 may include control registers (not shown) for setting/resetting the IOIF S bit for each I/O operation request. The setting/resetting of the IOIF S bit may be controlled by microcode running in a processor of the I/O device 410, 420, device drivers, or the like. Alternatively, the S bit information may be associated with the address for each I/O operation request. For example, the I/O device 410, 420 may store a list of addresses to which the I/O device 410, 420 may perform direct memory access (DMA) read/write operations. The IOIF S bit for each DMA address may be stored in association with the DMA addresses in the list such that there is a S bit for each DMA address.

In one exemplary embodiment of the present invention, the IOIF 430 is a PCI Express bus bridge. Thus, in this exemplary embodiment, the IOIF S bit is the Relaxed Ordering Attribute bit of the PCI Express architecture. I/O operation requests are therefore, processed through multiple layers of abstraction by the PCI Express bus bridge in a manner generally known in the art. For more information regarding the PCI Express architecture and the processing of I/O operation requests using the PCI Express architecture, reference is made to the PCI Express specification which is available at www.pcisig.com.

Upon receiving an I/O operation request from an I/O device 410, 420, the IOIF controller 440 performs I/O address translation and handles the IOIF S bit and SO bits in accordance with the present invention. In particular, the IOIF controller 440 implements the data structure shown in FIG. 5 and discussed hereafter, to determine whether to I/O operation request can be sent to the system bus immediately or whether it must wait for previous I/O operation requests to complete, i.e. reads and/or writes. This determination is based on the IOIF S bit and SO bits in a manner described hereafter.

As mentioned above, the S bit and I/O address are received by the IOIF controller 440 as part of the I/O operation request. The I/O address is translated and the SO bits are obtained from a corresponding I/O page table entry in either a Translation Lookaside Buffer (TLB) 444 of the IOIF controller 440 or from the address translation data structure 480. Typically the pertinent address translation information is found in the TLB 444 within the IOIF controller 440. The TLB 444 is a cache of the more recently used entries from the I/O segment table and I/O page table of the address translation data structure 480. If the TLB 444 does not contain the address translation information for the I/O operation request, then the IOIF controller 440 reads the applicable entries from the I/O segment table and I/O page table in the address translation data structure 480 within shared main memory 490 and caches the results in the TLB 444.

When the IOIF controller 440 determines that an I/O operation request can be performed, the I/O operation request is forwarded to the memory interface 450, such as via a system bus, e.g., system bus 106 in FIG. 1. The memory interface 450 may include one or more buffers 452-454 for storage of I/O operation requests for processing by the main processor 460.

The main processor 460 runs a hypervisor 470 which controls accesses to the shared main memory 490 by maintaining the address translation data structures 480, i.e. I/O segment table and I/O page table, in shared main memory 490. Alternatively, if no hypervisor 470 is provided in the system, the operations performed by the hypervisor may be performed by an operating system running on processor 460, for example. The address translation data structure 480 includes storage ordering (SO) bits for each page of shared main memory 490 represented in the address translation data structure. The SO bits identify whether I/O operation requests directed to a particular page of shared main memory 490 may be performed with weak ordering, relaxed ordering, or if strong (strict) ordering is required. The SO bits may be set for each page of shared main memory 490 by the hypervisor 470 based on predetermined criteria. For example, the hypervisor 470 may set the SO bits for the pages of shared main memory 490 such that those pages associated with I/O data have weak ordering while pages containing I/O write completion data have strong or strict ordering.

The software that is using the I/O data and I/O completion information knows what type of data is being stored in each page of the shared main memory 490 that it utilizes. In most cases, it is the device drivers of the I/O devices 410, 420 that know what types of data are being stored on which pages of shared memory. The software invokes the hypervisor 470 to set up the address translation for the appropriate pages and may, at that time, indicate to the hypervisor the appropriate SO bits for each page. If a page has both I/O data and write completion data, the SO bits may be set as if the page had only write completion data.

The IOIF controller 440 includes logic 449 for performing virtual to physical address translation for virtual addresses included in the I/O operation requests using the address translation data structure 480 or cached portions of the address translation data structure 480 in TLB 444. In addition, the IOIF controller 440 includes logic 449 for determining whether I/O operation requests may be executed out-of-order or not based on the settings of the IOIF S bit associated with the I/O operation requests and the SO bit associated with the targeted page of the shared main memory 490. Based on the determination as to whether an I/O operation may be performed out-of-order or not, the IOIF controller 440 performs the I/O operations on the shared main memory 490 via the memory interface 450 in accordance with the determined ordering. That is, the IOIF controller 440 determines whether the I/O operation requests may be sent to the shared main memory 490 immediately or must await completion of previous I/O operation requests before being sent to the shared main memory, as discussed in greater detail hereafter.

For example, an I/O operation request may be received into an I/O buffer 446 by the IOIF controller 440 which then performs address translation on the virtual address in the I/O operation request and identifies the SO bit associated with the targeted page of shared main memory 490. The IOIF controller 440 then looks at the setting of the SO bit and the IOIF S bit to select the weaker of the two indicated orderings. The IOIF controller 440 then either executes the I/O operation based on the ordering, e.g., if there is no previous I/O operation that must be completed first or if weak ordering is specified, or places the I/O operation in a I/O wait buffer 448, waiting for previous I/O operations to complete, e.g., if strict ordering is specified and previous I/O operations are still pending or if relaxed ordering is specified and previous write I/O operations are pending.

Thus, if the weaker of the two indicated orderings is a weak ordering, and instructions in a buffer 452 are stalled due to congestion for accessing portions of the shared main memory 490, then the present I/O operation may still be executed out-of-order even though previous I/O operations have not been completed yet. If the weaker of the two indicated orderings is a strong or strict ordering, then the I/O operation cannot be completed until all prior I/O operations have been completed. If the weaker of the two indicated ordering's is a relaxed ordering, then all previous write I/O operations must be performed before this I/O operation but previous read I/O operations may be performed before or after this I/O operation.

The various combinations of SO bit and IOIF S bit settings, in accordance with one exemplary embodiment of the present invention, is shown in FIG. 5 along with the resulting ordering of I/O operations. It should be appreciated that the combinations shown in FIG. 5 are only exemplary and modifications to these combinations may be made. For example, modifications may be made to increase the number of possible combinations, and thus the different types of orderings. These additional types of orderings may be keyed to other characteristics of the I/O operations that are to be performed, for example. The key concept, however, is to provide an ordering indicator in the address translation data structure which may be used alone or in combination with another ordering indicator present in the I/O interface to determine the actual ordering of I/O operations to a data storage device such as a shared main memory.

The table shown in FIG. 5 includes a first column 510 identifying the various possible settings of the IOIF S bit for a current I/O operation, a second column 520 identifying the various possible settings of the SO bits for the current I/O operation, and a third column 530 identifying the resulting ordering of I/O operations based on the combination of settings in columns 510 and 520. In these columns, the value "x" or "xx" indicates a "don't care" value meaning that the setting of this value is irrelevant due to the setting of the other value in either column 510 or 520.

In the depicted example, the IOIF S bit is a single bit value and the SO bits is a two-bit value. Thus, there are two possible settings for the IOIF S bit and four possible settings for the SO bits, only three of which are actually used in this particular embodiment. A setting of "0" in the IOIF S bit is indicative of a weak ordering and a "1" is indicative of strong (strict) ordering. A setting of "00" in the SO bits is indicative of a weak ordering and a "11" is indicative of a strong (strict) ordering. A setting of "10" in the SO bits is indicative of a relaxed ordering.

As shown in FIG. 5, if the IOIF S bit is set to "0", it does not matter what the value of the SO bits is since the weakest value is used to control the ordering. As a result, previous read and write I/O operations may be performed before or after the current I/O operation, i.e. weak ordering is followed. If the SO bits are set to "00", it does not matter what the value of the IOIF S bit is since the weakest value is used to control the ordering. As a result, again previous read and write I/O operations may be performed before or after the current I/O operation, i.e. weak ordering is followed.

If the IOIF S bit is set to "1" and the SO bits are set to "10", then a relaxed ordering is followed. The relaxed ordering is an ordering in which previous write I/O operations must be performed before the current I/O operation but previous read I/O operations may be performed either before or after the current I/O operation. Thus, the ordering permits out-of-order processing of the current I/O operation with respect to read I/O operations, but strict ordering with respect to write I/O operations.

If the IOIF S bit is set to "1" and the SO bits are set to "11", then a strong or strict ordering is followed. As a result, all previous read and write I/O operations must be performed before the current I/O operation is performed.

Figure 6:
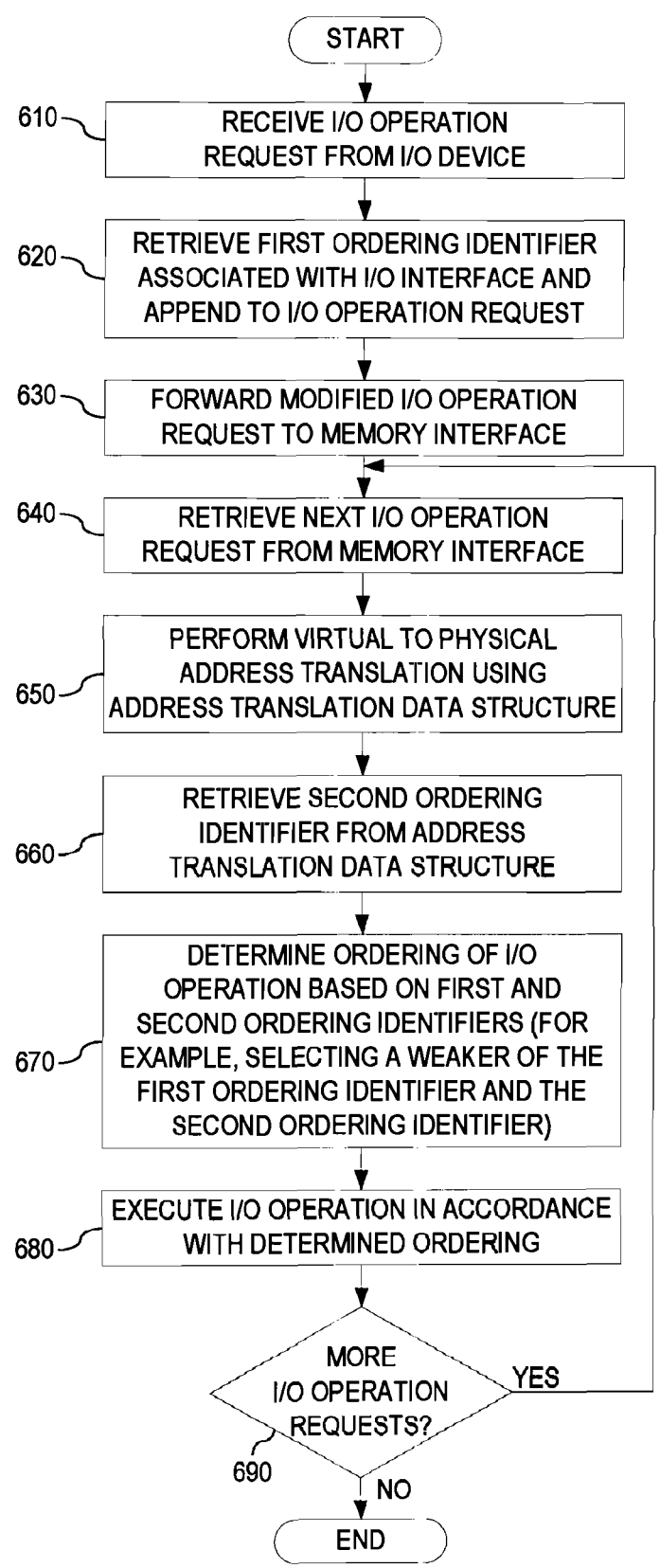
FIG. 6 is a flowchart outlining an exemplary operation of the present invention when processing an I/O operation request.

FIG. 6 is a flowchart outlining an exemplary operation of the present invention when processing an I/O operation request in accordance with an exemplary embodiment of the present invention. It will be understood that each block and combination of blocks of the flowchart illustration in FIG. 6 can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

As shown in FIG. 6, the operation starts by receiving, in the I/O interface controller, one or more I/O operation requests from an I/O device (step 610). A value of a first ordering identifier, e.g., an IOIF S bit, associated with the I/O interface for the virtual channel and I/O device identifier are stored along with the I/O operation request (step 620) in a command buffer in the IOIF controller.

A next I/O operation request is retrieved from the IOIF controller command buffer (step 640). Virtual to physical address translation is performed on the I/O operation request using an address translation data structure (step 650). A value of a second ordering identifier associated with the targeted page is retrieved from the address translation data structure, e.g., an SO bit value for the targeted page of shared main memory (step 660). A determination as to ordering of the I/O operation relative to previous I/O operations is made based on the values of the first and second ordering identifiers (step 670). This may be done using the table of FIG. 5, for example.

The processor then executes the I/O operation in accordance with the determined ordering (step 680). As mentioned above, this may include immediately executing the instruction to either read or write data from/to the storage device or waiting for previous I/O operations to complete before executing the I/O operation. Without waiting for this read or write operation to complete, a determination is then made as to whether additional I/O operation requests need to be processed (step 690). If not, the operation terminates. If additional I/O operation requests need to be processed, the operation returns to step 640.

The ability to specify weak ordering via the SO bits in the address translation data structure allows for simpler I/O device design, i.e. special logic within the I/O device itself need not be required in order to handle weak ordering of I/O operations. With the present invention, software, such as the hypervisor 470, may set up the address translation data structure so that the pages associated with I/O data have weak ordering and the pages containing I/O completion data have strong or strict ordering. There is no need for the I/O device to be cognizant of the I/O write that indicates completion. The I/O device can simply be given a sequence of I/O operations, e.g., direct memory access (DMA) operations, where the last operation is a write that indicates the I/O operation is complete. The I/O device can simply treat this as a sequence of I/O operations to initiate in the specified order, i.e. either weak ordering or strong ordering. Thus, a simple I/O device and/or I/O bridge can be used and ordering can still be controlled by software as needed via SO bits in an address translation data structure.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for ordering execution of input/output (I/O) operations, comprising:

receiving an I/O operation request via an I/O interface identifying a current I/O operation to be executed;

retrieving, from an address translation data structure, a first ordering identifier associated with a page of memory targeted by the I/O operation request, wherein the first ordering identifier identifies a relaxed ordering attribute and wherein the relaxed ordering attribute is a one bit value that is set to at least one of a 0 for a default ordering or a 1 for a relaxed ordering;

determining an ordering of execution of the current I/O operation based on the first ordering identifier, wherein determining an ordering of execution of the I/O operation based on the first ordering identifier and the second ordering identifier includes selecting a weaker of the first ordering identifier and the second ordering identifier; and executing the current I/O operation based on the determined ordering of execution of the current I/O operation, wherein the I/O operation request includes a second ordering identifier, wherein the second ordering identifier identifies storage ordering bits, wherein the storage ordering bits are at least a two bit value, and wherein determining an ordering of execution of the current I/O operation includes determining the ordering of the execution of the current I/O based on both the first ordering identifier and the second ordering identifier.

2. The method of claim 1, wherein the I/O interface is a Peripheral Component Interconnect (PCI) Express bus bridge.

3. The method of claim 1, wherein if either the first ordering identifier or the second ordering identifier identifies a weak ordering of I/O operations, then determining an ordering of execution of the current I/O operation includes identifying the ordering as a weak ordering in which any previous I/O operations may be executed before or after the current I/O operation.

4. The method of claim 1, wherein if the second ordering identifier identifies a strong ordering of I/O operations and the first ordering identifier identifies a relaxed ordering of I/O operations, then determining an ordering of execution of the current I/O operation includes identifying the ordering as a relaxed ordering in which any previous write I/O operations must be executed prior to execution of the current I/O operation and any previous read I/O operations may be executed before or after the current I/O operation.

5. The method of claim 1, wherein if both the first ordering identifier and the second ordering identifier identify a strong ordering of I/O operations, then determining an ordering of execution of the current I/O operation includes identifying the ordering as a strong ordering in which any previous I/O operations must be executed before the current I/O operation.

6. The method of claim 1, wherein the method is implemented in an I/O interface controller.

7. The method of claim 1, wherein the address translation data structure is an I/O page table.

8. The method of claim 1, further comprising:
performing a virtual to physical address translation on a virtual address in the I/O operation request using the address translation data structure, wherein retrieving the first ordering identifier associated with a page of memory targeted by the I/O operation request is performed as part of the virtual to physical address translation.

9. A computer program product comprising a computer storage medium having a computer readable program stored therein, wherein the computer readable program, when executed on a computing device, causes the computing device to:

receive an I/O operation request via an I/O interface identifying a current I/O operation to be executed;

retrieve, from an address translation data structure, a first ordering identifier associated with a page of memory targeted by the I/O operation request, wherein the first ordering identifier identifies a relaxed ordering attribute and wherein the relaxed ordering attribute is a one bit value that is set to at least one of a 0 for a default ordering or a 1 for a relaxed ordering;

determine an ordering of execution of the current I/O operation based on the first ordering identifier, wherein the computer readable program causes the computing device to determine an ordering of execution of the I/O operation based on the first ordering identifier and the second ordering identifier by selecting a weaker of the first ordering identifier and the second ordering identifier; and execute the current I/O operation based on the determined ordering of execution of the current I/O operation, wherein the I/O operation request includes a second ordering identifier, wherein the second ordering identifier identifies storage ordering bits, wherein the storage ordering bits are at least a two bit value, and wherein determining an ordering of execution of the current I/O operation includes determining the ordering of the execution of the current I/O based on both the first ordering identifier and the second ordering identifier.

10. The computer program product of claim 9, wherein the I/O interface is a Peripheral Component Interconnect (PCI) Express bus bridge.

11. The computer program product of claim 9, wherein if either the first ordering identifier or the second ordering identifier identifies a weak ordering of I/O operations, then the computer readable program causes the computing device to identify the ordering as a weak ordering in which any previous I/O operations may be executed before or after the current I/O operation.

12. The computer program product of claim 9, wherein if the second ordering identifier identifies a strong ordering of I/O operations and the first ordering identifier identifies a relaxed ordering of I/O operations, then the computer readable program causes the computing device to identify the ordering as a relaxed ordering in which any previous write I/O operations must be executed prior to execution of the current I/O operation and any previous read I/O operations may be executed before or after the current I/O operation.

13. The computer program product of claim 9, wherein if both the first ordering identifier and the second ordering identifier identify a strong ordering of I/O operations, then the computer readable program causes the computing device to identify the ordering as a strong ordering in which any previous I/O operations must be executed before the current I/O operation.

14. The computer program product of claim 9, wherein the computer program product is executed in an I/O interface controller.

15. The computer program product of claim 9, wherein the computer program product further causes the computing device to perform a virtual to physical address translation on a virtual address in the I/O operation request using the address translation data structure, and wherein the computer program product causes the computing device to retrieve the first ordering identifier associated with a page of memory targeted by the I/O operation request is performed as part of the virtual to physical address translation.

16. An apparatus, comprising:
a memory;
an input/output (I/O) interface; and
an I/O interface controller coupled to the input/output interface and the memory,
wherein the I/O interface controller:
receives an I/O operation request via the I/O interface identifying a current I/O operation to be executed;

retrieves a first ordering identifier associated with the I/O interface, wherein the first ordering identifier identifies a relaxed ordering attribute and wherein the relaxed ordering attribute is a one bit value that is set to at least one of a 0 for a default ordering or a 1 for a relaxed ordering;

retrieves a second ordering identifier associated with a page of the memory targeted by the I/O operation request from an address translation data structure, wherein the second ordering identifier identifies storage ordering bits, and wherein the storage ordering bits are at least a two bit value;

determines an ordering of execution of the current I/O operation based on the first ordering identifier and the second ordering identifier, wherein the I/O interface controller determines an ordering of execution of the I/O operation based on the first ordering identifier and the second ordering identifier by selecting a weaker of the first ordering identifier and the second ordering identifier; and executes the current I/O operation based on the determined ordering of execution of the current I/O operation.

* * * * *